(12) United States Patent
Das et al.

(10) Patent No.: US 10,303,572 B2
(45) Date of Patent: May 28, 2019

(54) METHODS AND SYSTEMS FOR IMPROVING FAULT TOLERANCE IN STORAGE AREA NETWORK

(71) Applicant: Wipro Limited, Bangalore (IN)

(72) Inventors: Rishav Das, Howrah (IN); Karanjit Singh, Tarn-Taran (IN)

(73) Assignee: WIPRO Limited, Bangalore (IN)

( * ) Notice: Subject to any disclaimer, the term of this patent is extended or adjusted under 35 U.S.C. 154(b) by 141 days.

(21) Appl. No.: 15/461,993

(22) Filed: Mar. 17, 2017

(65) Prior Publication Data

US 2018/0210797 A1     Jul. 26, 2018

(30) Foreign Application Priority Data

Jan. 23, 2017    (IN) .............................. 201741002578

(51) Int. Cl.
*G06F 11/00*     (2006.01)
*G06F 11/20*     (2006.01)
(Continued)

(52) U.S. Cl.
CPC .......... *G06F 11/2094* (2013.01); *G06F 3/067* (2013.01); *G06F 3/0619* (2013.01); *G06F 3/0647* (2013.01); *G06F 3/0683* (2013.01); *G06F 11/1092* (2013.01); *G06F 11/1662* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,989,205 A | * | 1/1991 | Dunphy, Jr. | ........ G06F 11/1008 360/902 |
| 5,077,736 A | * | 12/1991 | Dunphy, Jr. | ........ G06F 11/1008 360/903 |

(Continued)

OTHER PUBLICATIONS

White Paper, "High Availability, Data Protection and Data Integrity in the XtremIO Architecture", Apr. 2015, $EMC^2$, pp. 1-28.

(Continued)

*Primary Examiner* — Amine Riad
(74) *Attorney, Agent, or Firm* — Finnegan, Henderson, Farabow, Garrett & Dunner LLP (57) ABSTRACT

This disclosure relates generally to methods and systems for improving fault tolerance in virtual storage area network. In one embodiment, a virtual storage area network fault tolerance apparatus is provided. The apparatus comprises one or more hardware processors and one or more memory units storing instructions executable by the one or more hardware processors for identifying a fault associated with a hard drive included in a first disk array that includes one or more parity drives; determining that the one or more parity drives included in the first disk array are already in use; receiving an indication that one or more parity drives included in a second disk array are available for providing fault tolerance for the first disk array; and transferring data associated with the hard drive included in the first disk array for storage in the one or more parity drives included in the second disk array.

20 Claims, 8 Drawing Sheets

(51) Int. Cl.
*G06F 3/06* (2006.01)
*G06F 11/16* (2006.01)
*G06F 11/10* (2006.01)

(56) References Cited

U.S. PATENT DOCUMENTS

| | | | | |
|---|---|---|---|---|
| 5,331,646 A * | 7/1994 | Krueger | | G06F 11/1076 714/6.1 |
| 5,463,765 A * | 10/1995 | Kakuta | | G06F 11/1008 711/114 |
| 5,479,653 A * | 12/1995 | Jones | | G06F 11/1084 711/114 |
| 6,101,615 A * | 8/2000 | Lyons | | G06F 11/1076 711/114 |
| 6,327,672 B1 * | 12/2001 | Wilner | | G06F 11/1076 711/114 |
| 6,467,048 B1 * | 10/2002 | Olarig | | G11C 29/70 714/54 |
| 6,658,542 B2 * | 12/2003 | Beardsley | | G06F 11/0724 711/112 |
| 6,970,972 B2 * | 11/2005 | Hosoya | | G06F 11/1666 710/316 |
| 7,051,174 B2 * | 5/2006 | Ash | | G06F 11/1666 707/999.202 |
| 7,395,452 B2 * | 7/2008 | Nicholson | | G06F 1/30 714/22 |
| 7,600,087 B2 * | 10/2009 | Yamagami | | G06F 3/0619 711/161 |
| 8,694,826 B2 * | 4/2014 | Myrah | | G06F 11/1658 714/6.3 |
| 8,775,867 B2 * | 7/2014 | Blinick | | G06F 11/2028 714/4.11 |
| 8,990,615 B1 * | 3/2015 | Derbeko | | G06F 11/1662 714/6.1 |
| 9,286,219 B1 * | 3/2016 | Derbeko | | G06F 12/126 |
| 2005/0086557 A1 * | 4/2005 | Sato | | G06F 11/008 714/6.12 |
| 2005/0223269 A1 * | 10/2005 | Stolowitz | | G06F 3/0617 714/6.12 |
| 2011/0004785 A1 * | 1/2011 | Takada | | G06F 11/0727 714/6.32 |
| 2011/0113279 A1 * | 5/2011 | Cagno | | G06F 11/2089 714/5.11 |

OTHER PUBLICATIONS

Extended European Search Report issued in the European Patent Office in counterpart European Application No. 17164000.6, dated Oct. 26, 2017, 6 pages.

* cited by examiner

METHODS AND SYSTEMS FOR IMPROVING FAULT TOLERANCE IN STORAGE AREA NETWORK

TECHNICAL FIELD

This disclosure relates generally to storage area networks (SAN) and more particularly to methods and systems for improving fault tolerance in a virtual storage area network (VSAN)/SAN.

BACKGROUND

A SAN is a dedicated high-speed network which interconnects and presents a shared pool of storage devices to multiple servers (hosts). The SAN can be used to enhance performance of the storage devices by making the shared pool of the storage devices appear as a single locally attached device to each of the multiple servers. A VSAN is a logical partition in the SAN. The VSAN can allow data traffic to be isolated within specific portions of the SAN so that the system can be scaled out and easily configured. A primary objective of the VSAN is management of subscribers, who can be added or relocated without a need for changing physical layout of the storage devices. Another objective of the VSAN can be to provide data redundancy which can minimize risk of data loss.

A conventional VSAN/SAN storage array (VSAN/SAN cluster) comprises a brick or a "BOX" as the basic building block. The VSAN/SAN cluster can comprise multiple bricks/BOXes. The brick/BOX of the VSAN/SAN cluster consists of two array controllers and one driver yard (DY) or disk array enclosure (DAE). The array controllers receive input/output (I/O) requests from a host and each of the array controllers comprises multi-core CPUs for processing the I/O tasks. The DY/DAE contains multiple solid state drives (SSD) for storing data and a few backup units (parity drives). In the conventional architecture of the VSAN/SAN cluster, if a failure is detected on the SSD in the DY/DAE of the brick/BOX, data from the failing SSD is backed up to an available parity drive in the DY/DAE of the brick/BOX.

There are several technical problems with such conventional systems, as explained below. First, for the case of a failure detection of the SSD in the DY/DAE of the brick/BOX of the VSAN/SAN cluster and all the parity drives in the DY/DAE of the brick/BOX already in use, there is no system or method for backing up data from the failing SSD to the available parity drive in a different brick/BOX of the VSAN/SAN cluster. There is no system or method that can help the brick/BOX to communicate with a different brick/BOX of the VSAN/SAN cluster and facilitate backup of the data. Additionally, in the conventional architecture of the VSAN/SAN cluster there is no provision to transfer data from the DAE/DY of one brick/BOX to the DAE/DY of another brick/BOX in order to maintain high data availability. As an example, data from the SSD can be permanently lost if the data from the SSD cannot be backed up before the SSD fails. Hence, there is a need for a novel method and system for improving fault tolerance in the VSAN/SAN.

SUMMARY

Embodiments of the present disclosure present technological improvements as solutions to one or more of the above-mentioned technical problems in conventional systems. In one embodiment, a VSAN/SAN fault tolerance apparatus is provided. The apparatus comprises one or more hardware processors and one or more memory units storing instructions executable by the one or more hardware processors for identifying a fault associated with a hard drive included in a first disk array that includes one or more parity drives; determining that the one or more parity drives included in the first disk array are already in use; receiving an indication that one or more parity drives included in a second disk array are available for providing fault tolerance for the first disk array; and transferring data associated with the hard drive included in the first disk array for storage in the one or more parity drives included in the second disk array.

In another embodiment, a method of fault tolerance in VSAN/SAN is provided. The method comprises: identifying a fault associated with a hard drive included in a first disk array that includes one or more parity drives; determining that the one or more parity drives included in the first disk array are already in use; receiving an indication that one or more parity drives included in a second disk array are available for providing fault tolerance for the first disk array; and transferring data associated with the hard drive included in the first disk array for storage in the one or more parity drives included in the second disk array.

In yet another embodiment, a non-transitory computer readable storage medium is provided. The storage medium stores a program that, when executed by a computer, cause the computer to perform a method of fault tolerance in VSAN/SAN. The method comprises identifying a fault associated with a hard drive included in a first disk array that includes one or more parity drives; determining that the one or more parity drives included in the first disk array are already in use; receiving an indication that one or more parity drives included in a second disk array are available for providing fault tolerance for the first disk array; and transferring data associated with the hard drive included in the first disk array for storage in the one or more parity drives included in the second disk array.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments described herein provide methods and systems for improving fault tolerance in a VSAN/SAN. The disclosed methods and systems comprise a BOX as a basic building block for a VSAN/SAN cluster. An individual BOX can comprise two array controllers (AC) and a disk yard. In some embodiments, the BOX may include a Small Computer System Interface (SCSI) driver, which can physically connect and transfer data between a host and the ACs of the BOX. Each AC can comprise multiple processor cores and a hardware manager (HM). In one embodiment, an individual AC comprises ten cores in order to perform processes from individual process queue.

The disk yard of the BOX can comprise a plurality of disks or SSD for data storage and one or more parity drives for data backup and protection. In one embodiment, the disk yard of the BOX comprises twenty three SSD drives for data storage and two parity drives for data backup. If a failure is detected on the SSD in the disk yard of the BOX, data from the failing SSD can be backed up to an available parity drive in the disk yard of the BOX. In one embodiment, a failure of the SSD in a disk yard of a box of a VSAN/SAN cluster may be detected and all the parity drives in the disk yard of the BOX may already be in use, then, the disclosed methods and systems can back up data from the failing SSD to an available parity drive in a different BOX of the VSAN/SAN cluster. In another embodiment, data from a disk yard of one BOX can be transferred to a disk yard of a different BOX in a VSAN/SAN in order to maintain high data availability. The disclosed methods and systems can therefore provide improved fault tolerance in a VSAN/SAN compared with conventional architecture.

In some embodiments, a VSAN/SAN cluster can include a management server (MS) comprising a master routing (MR) module. For the purposes of this disclosure, "modules" may be implemented in software, hardware, firmware, a mix of any of those, or the like. As an example, the MR module may be a software module that can identify I/O requests from the host. Processors, I/O devices, and memory devices may be used to perform processes to implement and facilitate operations of the modules. Thus, the modules may include code instructions executable by one or more processors, alone or in various combinations with other modules disclosed in this or other embodiments. If the disclosed "modules" are implemented in hardware, they may comprise an embedded system or other dedicated hardware configured by machine code, assembly code, or the like to interact with other modules to perform functions consistent with disclosed embodiments.

In some embodiments, a VSAN/SAN cluster can comprise two or more BOXes in order to increase the performance and capacity of the VSAN/SAN cluster. One BOX in a VSAN/SAN cluster can include a data protection management agent (DPMA) and a V-Kariad Data Protection Management (VKDM).

The VKDM, the DPMA and MR modules can facilitate communication between different BOXes of the VSAN/SAN cluster. Embodiments of the present disclosure can check for failing drives in a BOX of the VSAN/SAN cluster and in response to failure detection, can backup data from the failing drive to the available parity drive in the BOX. In an embodiment, if there are no parity drives available in the first BOX, embodiments of the present disclosure can backup data from the failing drive in the first BOX to the available parity drive in a different BOX of the VSAN/SAN cluster. For instance, if BOX1 detects a failing drive in its disk yard and all the parity drives in BOX1 are already used to backup data from other failing drives, then the disclosed methods and systems can check other BOXes of the VSAN/SAN cluster for availability of the parity drives. If a parity drive is found available in BOX2, then data from the failing drive in BOX1 can be backed up to the parity drive of BOX2.

Accordingly, the disclosed methods and systems can backup data from the failing drive in one BOX to the available parity drive in a different BOX of the VSAN/SAN. This offers a significant advantage over conventional VSAN/SAN brick/BOX architecture, where for the case of the failing drive and all the parity drives in the brick/BOX already used up, data from the failing drive cannot be backed up to the available parity drive in a different brick/BOX of the VSAN/SAN cluster. Additionally, disclosed methods and systems can provide higher data availability by backing up data from SSD of one BOX to the parity drives of a different BOX in the VSAN/SAN cluster. Accordingly, present disclosure offers methods and systems for improved fault tolerance in a VSAN/SAN. This can enable system designers to reserve fewer drives as parity drives within a BOX and a larger proportion of drives can therefore be made available for data storage.

Figure 1:
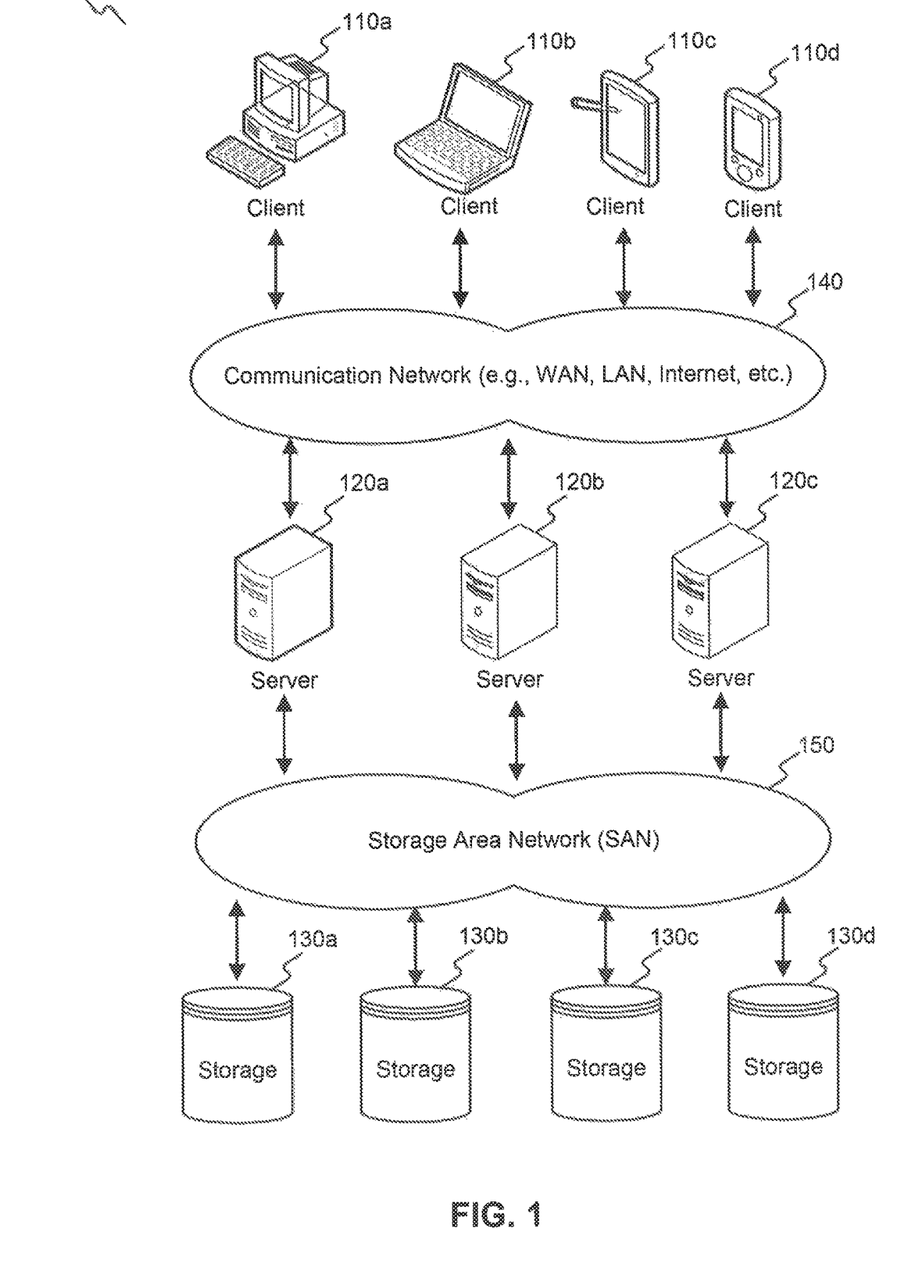
FIG. 1 illustrates an exemplary storage area network in accordance with some embodiments of the present disclosure.

FIG. 1 illustrates an exemplary network environment 100 comprising a SAN 150. Network environment 100 can include one or more client devices 110(a-d), one or more servers 120(a-c) and one or more storage devices 130(a-d). Client devices 110(a-d) can communicate with servers 120 (a-c) using a communication network 140. While the client devices 110(a-d) are portrayed as a computer, laptop, tablet, and a mobile smartphone, it is appreciated that the client devices 110(a-d) can be any other type of device. The communication network 140 can be a public network or a private network such as a wide area network (WAN), local area network (LAN), internet. The servers 120(a-c) can provide requested data and services to the client devices 110(a-d) using the communication network 140. The SAN 150 can be a dedicated high-speed network which interconnects and presents the shared pool of storage devices 130 (a-d) to the servers 120(a-c). The SAN 150 can be divided into logical partitions of VSAN/SAN. As an example, the storage devices 130a and 130b of SAN 150 can be partitioned into one VSAN/SAN storage array and the storage devices 130c and 130d can be partitioned into a second VSAN/SAN storage array.

Figure 2:
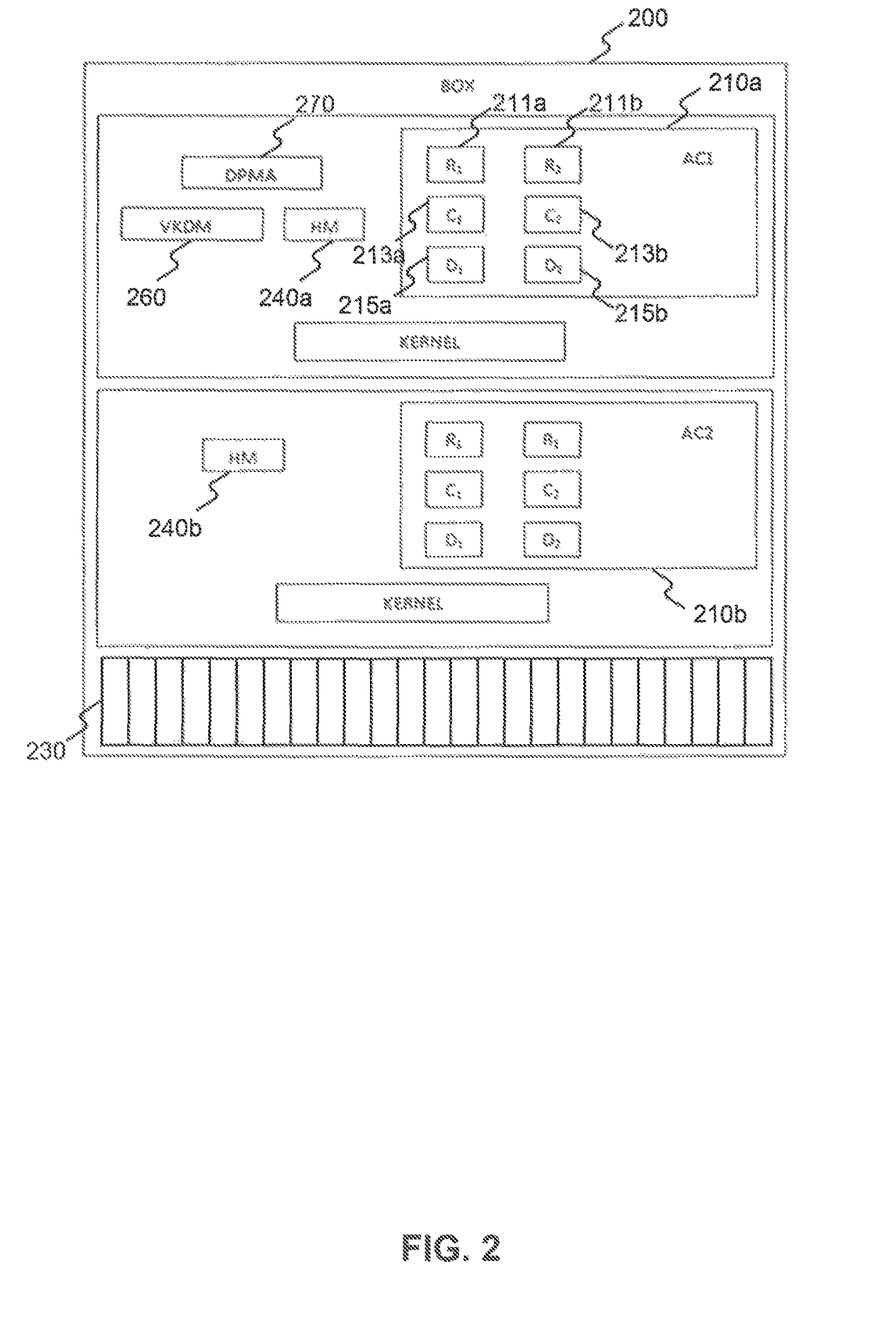
FIG. 2 is a functional block diagram of an exemplary BOX of a VSAN/SAN storage array according to some embodiments of the present disclosure.

FIG. 2 illustrates a functional block diagram of an exemplary BOX 200 of a VSAN/SAN storage array according to some embodiments of the present disclosure. Storage devices 130(a-d) of FIG. 1 may each comprise one or more BOXes. The BOX 200 can include two array controllers AC1 210a and AC2 210b. Array controllers (210a and 210b) can be used to manage disk drives in a disk yard 230 and present them as logical units to a host. The host may be one of one or more servers 120(a-c) of FIG. 1. The array controllers (210a and 210b) can be used to process all read/write requests to the disk yard 230.

AC1 210a and AC2 210b can include embedded processor cores that can be used to perform a wide range of I/O functions. In one example, the array controllers (210a and 210b) can include ten processor cores. However, other embodiments may include greater or less than ten processor cores. The BOX 200 shown in FIG. 2 comprises two array controllers (210a and 210b), however in some embodiments the BOX 200 can include multiple pairs of the array controllers (210a and 210b). Each array controller (210a and 210b) can include a pair of routing modules 211, a pair of control modules 213 and a pair of data flow modules 215. As an example, AC1 210a of FIG. 2 comprises a pair of routing modules (211a and 211b), a pair of control modules (213a and 213b) and a pair of data flow modules (215a and 215b). The routing modules (211a and 211b), the control modules (213a and 213b) and the data flow modules (215a and 215b) can enable the array controllers (210a and 210b) to receive I/O requests from the host and perform read, write or erase operations to the disk yard 230. The routing modules (211a and 211b), control modules (213a and 213b) and data flow modules (215a and 215b) are further explained with reference to FIG. 3.

Figure 3:
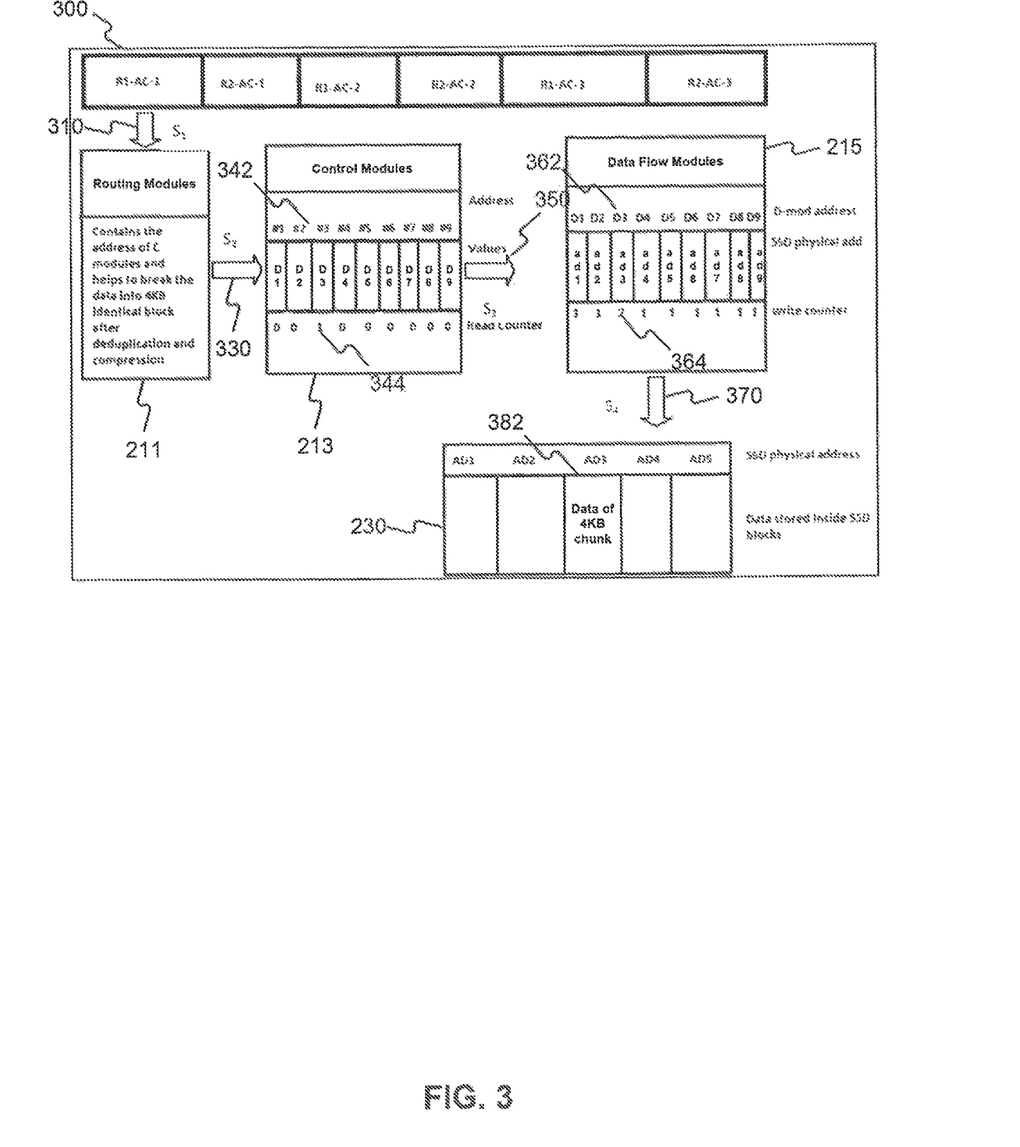
FIG. 3 is a functional block diagram of an exemplary BOX processing an I/O request using routing modules, control modules and data flow modules according to some embodiments of the present disclosure.

FIG. 3 illustrates a functional block diagram of an exemplary BOX 300 processing an I/O request using routing modules 211, control modules 213 and data flow modules 215 according to some embodiments of the present disclosure. The BOX 300 can be, similar to BOX 200 in FIG. 2, part of a VSAN/SAN storage array. The routing modules 211 can receive an I/O request 310 from a host, for example server 120a of FIG. 1. In some embodiments, the routing modules 211 can be the only modules in a BOX that can receive I/O requests from the host. The routing modules 211 can store addresses of the control modules 213. The routing modules 211 can forward the I/O request 310 received from the host to appropriate control module 213 (signal 330). In some embodiments, the routing modules 211 can also breakup I/O data for write requests to SSD in disk yard 230 into identical-sized chunks of four kilo bytes each.

The control modules 213 can receive the signal 330 from the routing modules 211. The control modules 213 can translate the address provided by the host to an internal mapping address 342. In some embodiments, the control modules 213 can use a hashing algorithm to convert the address provided by the host to the internal mapping address 342. Further, the control modules 213 can forward the I/O request with translated address to appropriate data flow modules 215. In some embodiments, the control modules 213 can additionally include a read counter 344. Read counter 344 value can be incremented each time a block of data is read from solid state drives comprising the disk yard 130. As an example, the read counter 344 corresponding to a storage location 382 (in disk yard 130) can be incremented when a four kilo byte chunk of data is read from the storage location 382.

The data flow modules 215 can receive I/O request 350 with a translated internal mapping address from the control modules 213. In some embodiments, the data flow modules 215 can perform read, write and erase operations to SSDs in disk yard 230. The data flow modules 215 can translate the internal mapping address provided by the control modules 213 to physical addresses 362 of the SSDs in disk yard 230. The data flow modules 215 can use the physical addresses 362 to perform I/O operation requested by the host (signal 370). In some embodiments, the data flow modules 215 can include a write counter 364. The write counter 364 can be incremented each time a block of data is written to the corresponding SSD in disk yard 230. As an example, the write counter 364 corresponding to the storage location 382 can be incremented when a four kilo byte chunk of data is written to the storage location 382.

In some embodiments, the BOX 300 may comprise a small computer system interface (SCSI) driver that can physically connect and transfer data between the host and SSDs in the disk yard 230 of BOX 300. Data can be, for example, transferred between SCSI driver and SSD 382 of BOX 300 comprising routing modules 211, control modules 213 and data flow modules 215 as illustrated in FIG. 3.

Figure 4:
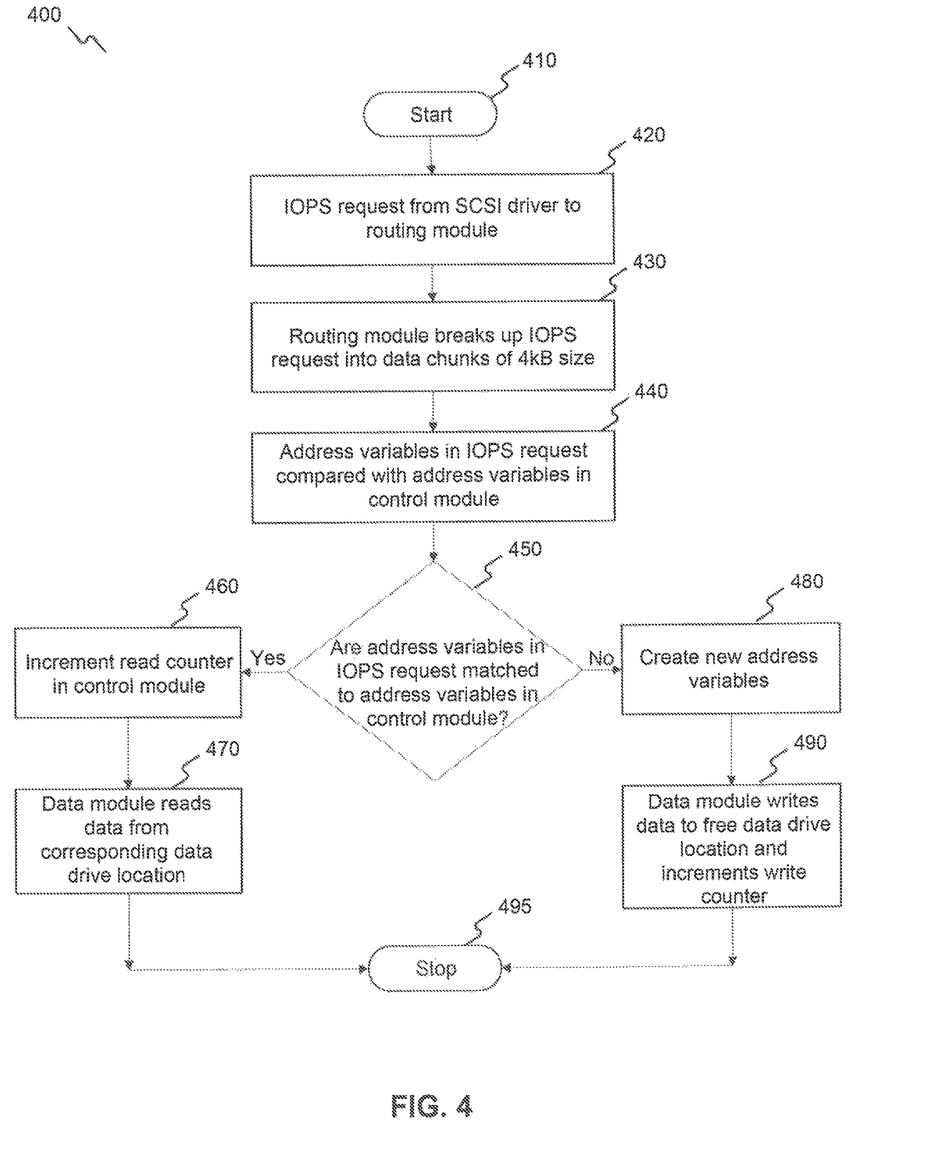
FIG. 4 is a flow diagram illustrating an exemplary data transfer procedure from a Small Computer System Interface (SCSI) driver to data drives using routing modules, control modules and data flow modules in accordance with some embodiments of the present disclosure.

FIG. 4 is a flow diagram illustrating an exemplary data transfer procedure 400 from a SCSI driver to data drives using routing modules 211, control modules 213 and data flow modules 215 in accordance with some embodiments of the present disclosure. Referring to FIG. 4, it will be readily appreciated by one of ordinary skill in the art that the illustrated procedure can be altered to modify the order of steps, delete steps or further include additional steps.

After initial step 410, the routing modules 211 can receive an IOPS (input/output operations per second) request from the SCSI driver (step 420). For a write request, the routing modules 211 can break down IOPS request data into chunks of four kilo byte size (step 430). The routing modules 211 can forward the IOPS request to the control modules 213. In step 440, address variables in the IOPS request can be compared with address variables stored in the control modules 213. The comparison can be performed to verify if data in IOPS request is already present in data drives (read request) or if data is new (write request).

In step 450, if comparison determines that the address variables are matched, then a read counter 344 in the control modules 213 can be incremented (step 460). Further, the data flow modules 215 can read requested data from corresponding data drive location within a disk yard 230 (step 470). If, however comparison in step 450 determines that the address variables are not matched, then new address variables can be created (step 480). Further, the data flow modules 215 can write data in IOPS request to an available data drive location within the disk yard 230 (step 490).

Referring back to FIG. 2, each array controller (210a and 210b) of the BOX 200 can include a hardware manager (HM) 240. For embodiment shown in FIG. 2, AC1 210a can include HM 240a and AC2 210b can include HM 240b. Additionally, one array controller 210 within a VSAN/SAN cluster can include a VKDM and DPMA. For embodiment shown in FIG. 2, AC1 210a of the BOX 200 can include VKDM 260 and DPMA 270. HM 240a and HM 240b can monitor heath of all hardware components in the BOX 200. In some embodiments, HM 240a and HM 240b can notify VKDM 260 if any of the hardware components is detected to be faulty. Additionally, VKDM 260 can be an overall manager and all HM modules 240 in a VSAN/SAN cluster can report health of hardware components to VKDM 260.

In some embodiments, HM 240a and HM 240b can monitor health of data drives in the disk yard 230 and can notify DPMA 270 if any data drive is detected to be failing. DPMA 270 can, in response to the failure notification, retrieve data from the failing data drive and backup the retrieved data to an available parity drive of the disk yard 230. DPMA 270 can, in response to the failure notification and no available parity drives in the disk yard 230 of the BOX 200, backup the data from the failing data drive to an available parity drive in a different BOX of the VSAN/SAN cluster. DPMA 270 can communicate with a MR module in a management server to perform the data backup to a different BOX of the VSAN/SAN cluster.

In some embodiments, the BOX 200 can include the disk yard 230. The disk yard 230 can include a plurality of disk drives or SSDs for storing data. Some of the disk drives or SSDs within the disk yard 230 can be used as parity drives for fault tolerance by backing up data from the failing drives. In one embodiment, the BOX 200 can include the disk yard 230 with 23 data drives and 2 parity drives for fault tolerance. Other embodiments can include greater or fewer drives. FIG. 2 shows the disk yard 230 with twenty five SSDs of which two SSDs are utilized as parity drives (N+2 protection).

Figure 5:
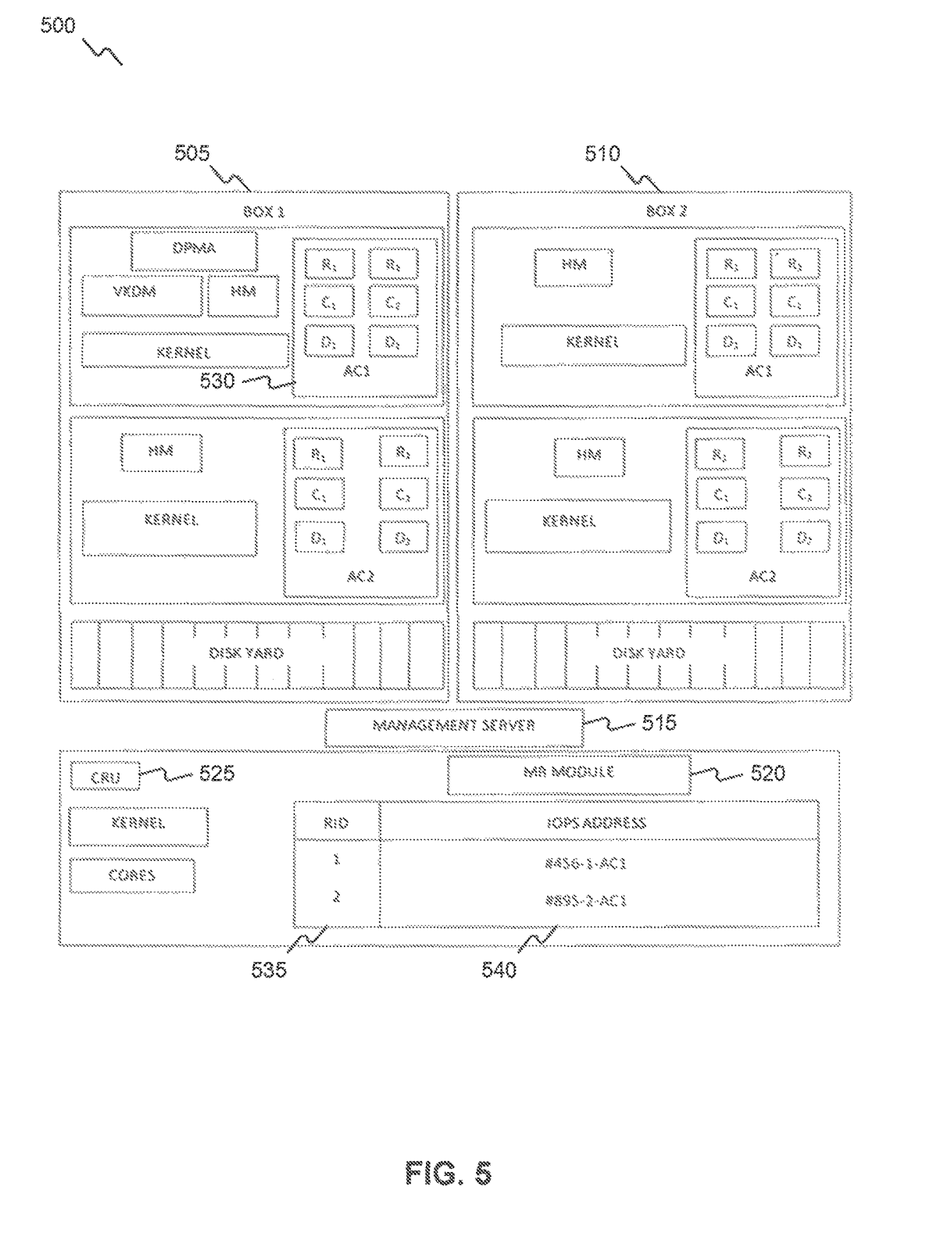
FIG. 5 is a functional block diagram of an exemplary VSAN/SAN cluster in accordance with some embodiments of the present disclosure.

A VSAN/SAN storage array or cluster can comprise a plurality of BOXes similar to exemplary BOX 200. FIG. 5 illustrates a functional block diagram of an exemplary VSAN/SAN cluster 500 in accordance with some embodiments of the present disclosure. In addition to the plurality of BOXes, the VSAN/SAN cluster 500 can comprise a management server. For the embodiment shown in FIG. 5, the VSAN/SAN cluster 500 can include two BOXes (505 and 510) and the management server 515.

BOX 505 and BOX 510, similar to exemplary BOX 200, can each include two array controllers (210a and 210b) and a disk yard 230. The disk yard 230 can comprise a plurality of data drives and parity drives. Each array controller (210a and 210b) can include two routing modules 211, two control modules 213, two data flow modules 215, HM 240, kernel, and processor cores (not shown in FIG. 5). One array controller 210 of the VSAN/SAN cluster 500 can further include a VKDM 260 and a DPMA 270 module. For the VSAN/SAN cluster 500 shown in FIG. 5, the array controller 530 of BOX 505 can include VKDM 260 and DPMA 270 modules.

MS 515 can include processor cores and kernel. In some embodiments, MS 515 can perform various system management tasks including managing the array controllers 210, the disk yards 230 and overall functioning of the data storage and retrieval in the VSAN/SAN cluster 500. As an example, a VSAN/SAN network administrator can use MS 515 to check the overall storage status of the VSAN/SAN cluster 500. MS 515 can provide to the network administrator information regarding the data drives and the parity drives being used. In some embodiments, MS 515 can include the MR module 520 and a control routing unit (CRU) 525.

MR module 520 can include a data structure comprising routing module IDs (RID) 535 and IOPS addresses 540 for the corresponding RIDs 535. In some embodiments, the routing modules 211 can update MR module 520 each time an IOPS request is routed from SCSI drivers to the routing modules 211. RID 535 can help identify which routing module an I/O operation belongs to. Additionally, every RID 535 can have a corresponding IOPS address 540. As an example, in FIG. 5, RID 1 535 corresponds to IOPS address "#456-1-AC1." The IOPS address can be a combination of the IOPS name "#456", RID "1" and array controller number "AC1."

In some embodiments, CRU 525 can be a small memory unit used during transfer of data from a faulty drive in one BOX to an available parity drive in a different BOX. An exemplary data transfer flow using CRU 525 is described with reference to FIG. 6.

Figure 6:
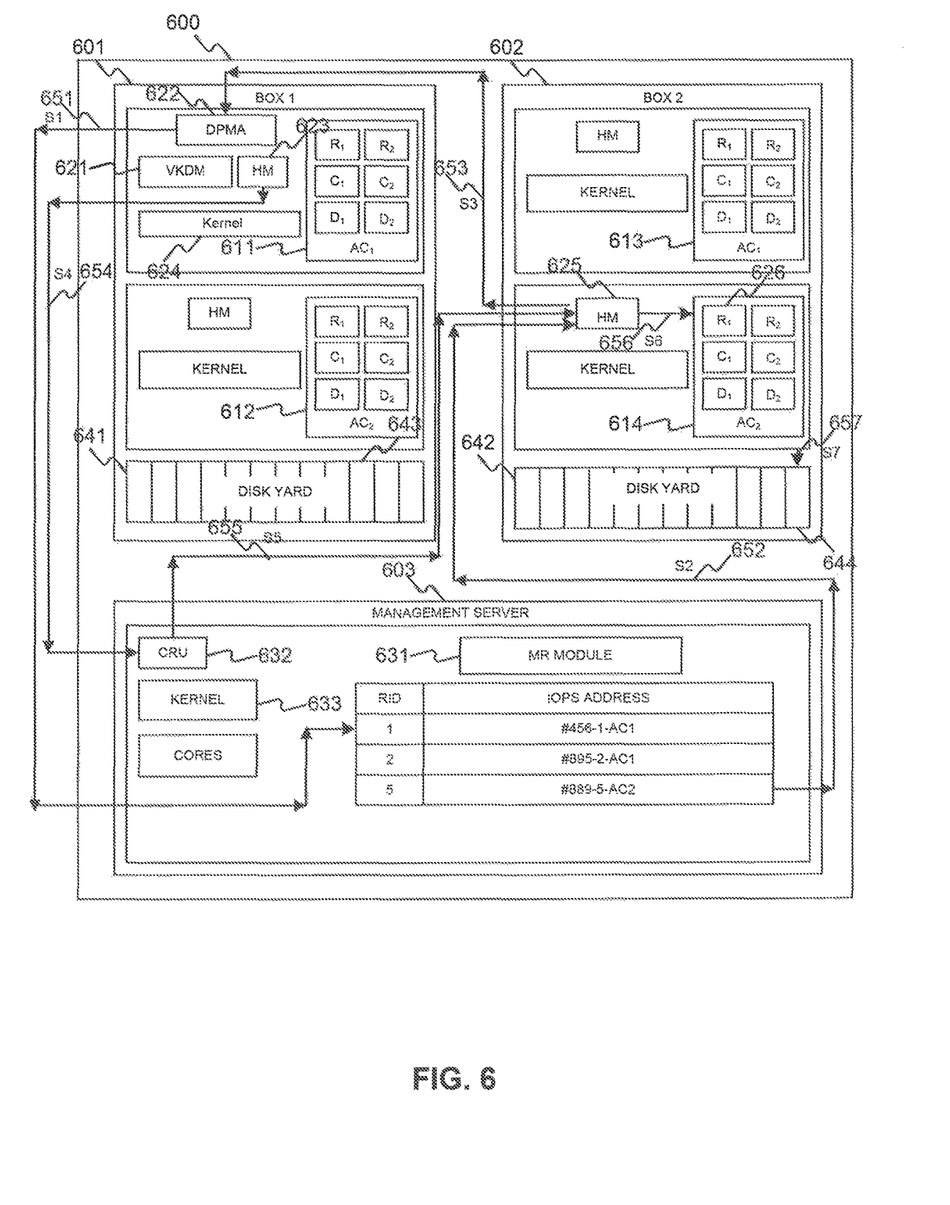
FIG. 6 is a functional block diagram of exemplary components to improve fault tolerance in a VSAN/SAN cluster in accordance with some embodiments of the present disclosure.

FIG. 6 illustrates a functional block diagram of exemplary components to improve fault tolerance in a VSAN/SAN cluster 600 in accordance with some embodiments of the present disclosure. The exemplary VSAN/SAN cluster 600 of FIG. 6 can include two BOXes (601 and 602) and management server 603. BOX1 601 and BOX2 602 can each include two array controllers. BOX1 601 can include array controllers 611 and 612, and BOX2 602 can include array controllers 613 and 614. Each array controller can include a HM and a pair of routing modules, control modules and data flow modules. BOX1 601 and BOX2 602 can include a SCSI driver, kernel and processor cores (not shown in FIG. 6). For embodiment shown in FIG. 6, array controller 611 can include VKDM module 621 and DPMA module 622. Management server 603 can include MR module 631 that can store RID and corresponding IOPS addresses of all R modules included in VSAN/SAN cluster 600.

HMs of BOX1 601 and BOX2 602 can monitor the data drives in disk yards (641 and 642) respectively and detect a failing drive. As an example, HM 623 of BOX1 601 can detect a drive 643 in the disk yard 641 is failing. HM 623 can notify VKDM 621 and DPMA 622 in response to the failure detection.

DPMA 622 can communicate with kernel 624 of AC 611 to determine routing module corresponding to the failing drive 643. DPMA 622 can check if any parity drives in the disk yard 641 are available for backing up data from the failing drive 643. If a parity drive is available, data from the failing drive 643 can be backed up to the available parity drive. If all parity drives in disk yard 641 are already used, DPMA 622 can communicate (651, signal $S_1$) with MR module 631 of management server 603 to determine if any parity drives are available in other BOXes of the VSAN/SAN cluster 600.

Kernel 633 of MS 603 can determine that a parity drive 644 is available in BOX 602. MR module 631 can communicate (652, signal $S_2$) with HM 625 of array controller 614 to verify availability of parity drive in the disk yard 642 of the BOX2 602. Data backup can be initiated by transferring data from the failing drive 643 in the BOX1 601 to the CRU 632 (654, signal $S_4$). MR module 631 can provide IOPS address of corresponding routing module 626 in AC 614 and the data can then be transferred from the CRU 632 to the BOX2 602 (655, signal $S_5$). The HM 625 of the BOX 602 can use routing module 626 to transfer data to available parity drive 644 (656, signal $S_6$ and 657, signal $S_7$). In some embodiments, the HM 625 of the BOX2 602 can acknowledge (653, signal $S_3$) to DPMA 622 that the data from the failing drive 643 has been successfully transferred to the parity drive 644 in the BOX2 602. Exemplary components 600 can therefore improve fault tolerance of the VSAN/SAN cluster by backing up data from the failing drive in a first BOX to the parity drive of a second BOX of the VSAN/SAN cluster (for cases where all parity drives in the first BOX are already used and a parity drive is available in the second BOX).

Exemplary VSAN/SAN cluster 600 shown in FIG. 6 includes two BOXes. Other embodiments of disclosed methods and systems can include more than two BOXes. Data from the failing drives in one BOX can be backed up to the parity drives in other BOXes of the VSAN/SAN cluster. As an example, if every BOX in the VSAN/SAN cluster includes two parity drives, then a cluster with two BOXes can sustain four drive failures, a cluster with three BOXes can sustain six drive failures, and similar methods and systems extended to a cluster with eight BOXes that can sustain sixteen drive failures.

Figure 7:
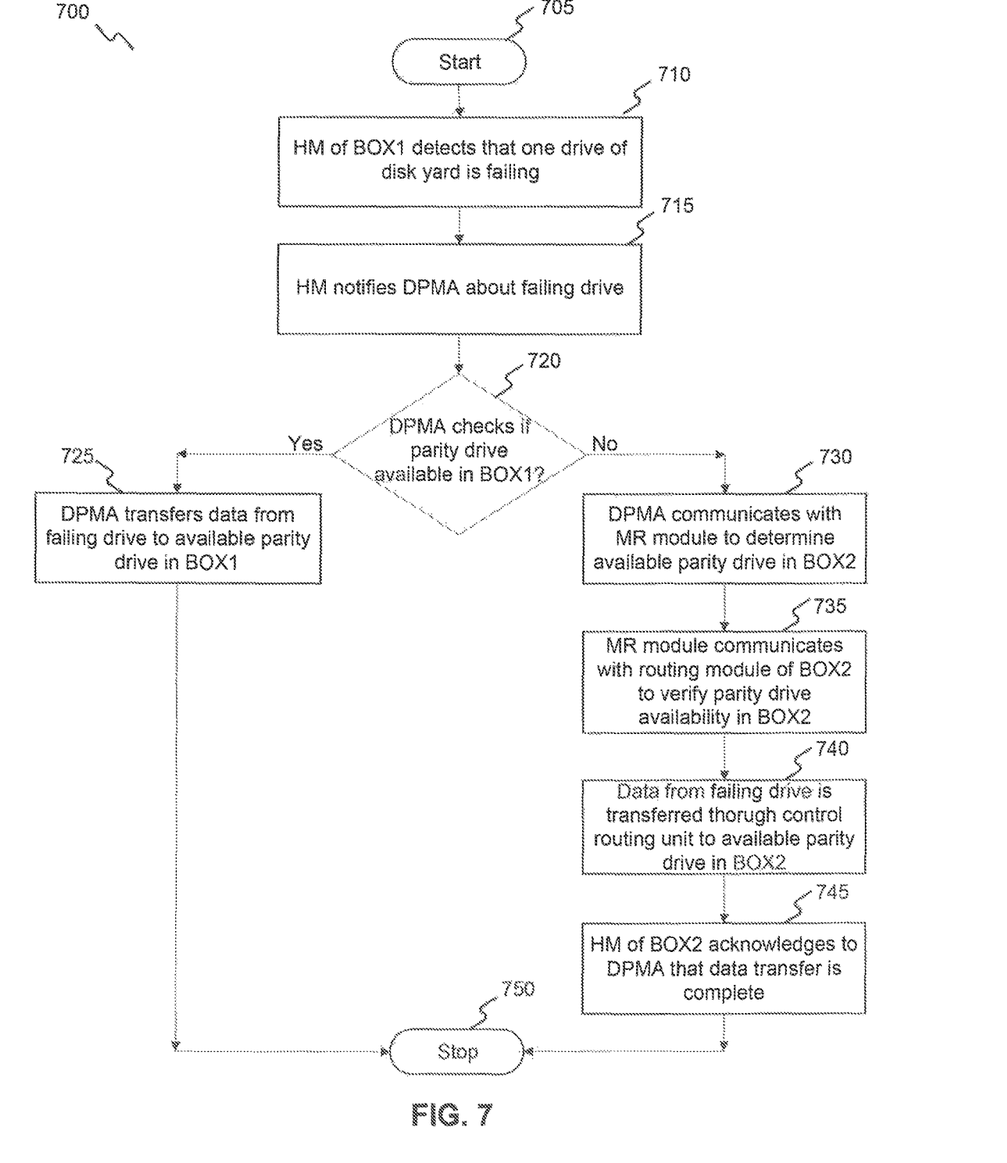
FIG. 7 is a flow diagram illustrating an exemplary method to improve fault tolerance in VSAN/SAN clusters in accordance with some embodiments of the present disclosure.

FIG. 7 is a flow diagram illustrating an exemplary method 700 to improve fault tolerance in VSAN/SAN clusters in accordance with some embodiments of the present disclosure. Referring to FIG. 7, it will be readily appreciated by one of ordinary skill in the art that the illustrated method can be altered to modify the order of steps, delete steps or further include additional steps.

Exemplary method 700 can be performed by the VSAN/SAN cluster 600 of FIG. 6 comprising a management server 603 and two BOXes, BOX1 601 and BOX2 602. BOX1 601 and BOX2 602 can each include a disk yard and two array controllers, AC1 and AC2. BOX1 can, for example, be BOX1 601 comprising disk yard 641, AC1 611, and AC2 612 shown in FIG. 6. Each disk yard can include two parity drives. AC1 611 and AC2 612 can each include a HM and a pair of routing modules, control modules and data flow modules. One array controller of the VSAN/SAN cluster 600 can include a VKDM module and a DPMA module. For example, AC1 611 of BOX1 601 can include the VKDM 621 and the DPMA 622. MS 603 can include the CRU module 632 and the MR module 631.

After initial step 705, HM 623 of AC1 611 of BOX1 601 can detect that a data drive in disk yard 641 of BOX1 601 is failing (step 710). As an example, HM 623 of BOX1 601 can detect a drive 643 in the disk yard 641 of FIG. 6 is failing. In step 715, HM can notify DPMA about the failing drive. In some embodiments, the information can include routing module information for the failing drive.

In step 720, DPMA 622 can check if a parity drive is available in BOX1 601. If a parity drive is available in BOX1 601, the data from the failing drive 643 can be backed up to an available parity drive (step 725). If a parity drive is not available in BOX1 601, DPMA 622 can communicate with MR module 631 to determine availability of parity drives in BOX2 602 (step 730). As an example, both parity drives in BOX1 601 can be already used for backing up two data drive failures in BOX1 601. If a third drive failure is detected, there are no parity drives available and DPMA communicates with the MR module 631 to determine parity drive availability in BOX2 602.

The MR module can communicate with routing module 626 of AC2 614 of BOX2 602 to verify that a parity drive is available in BOX2 602 (step 735). As an example, a parity drive 644 can be available in BOX2 602 of FIG. 6. In step 740, the data from the failing drive 643 can be copied to the CRU 632 and then transferred from the CRU 632 to the available parity drive in BOX2 602. In step 745, HM 625 of AC2 614 of BOX2 602 can send an acknowledgement signal to DPMA 622 indicating that the data backup is complete.

Computer System

Figure 8:
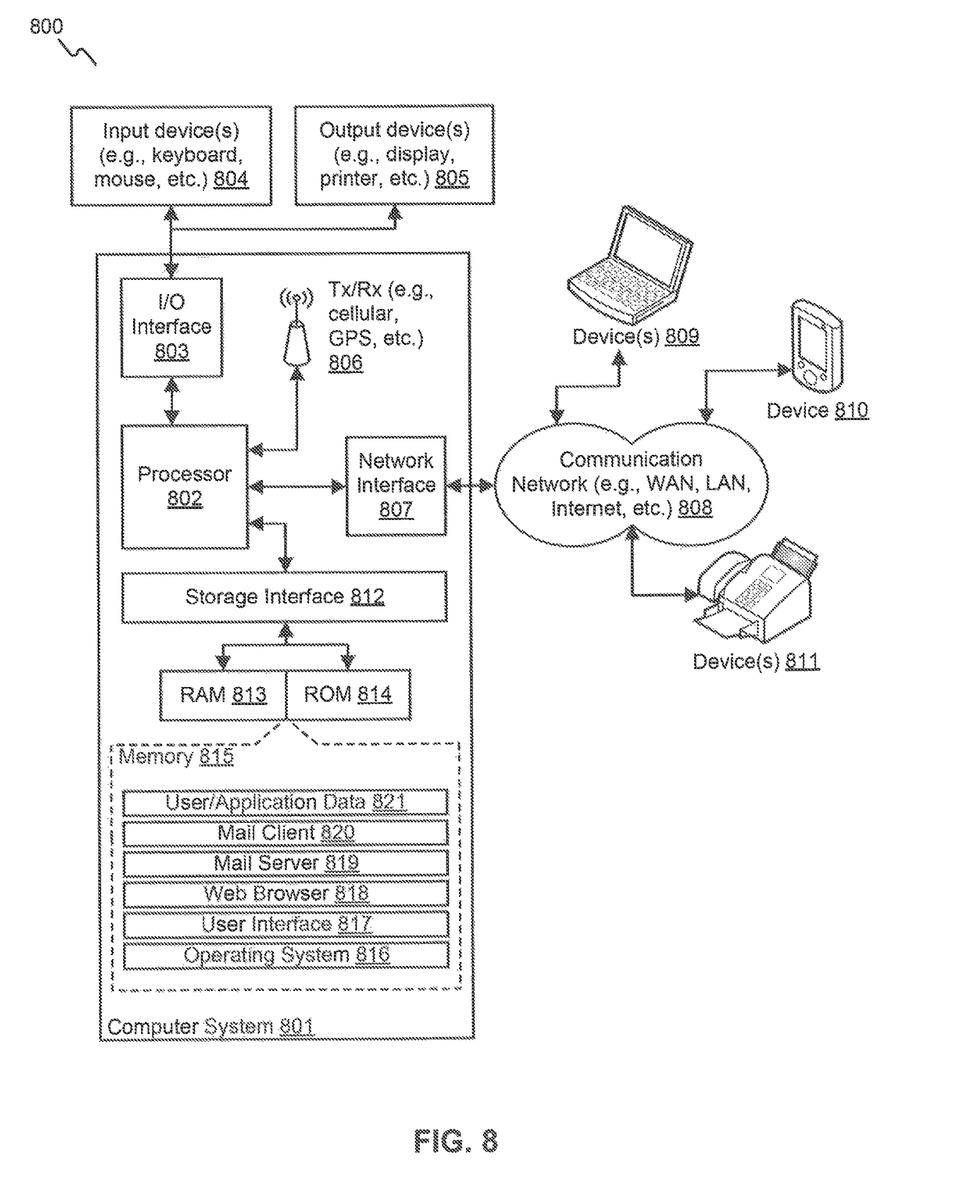
FIG. 8 is a block diagram of an exemplary computer system for implementing embodiments consistent with the present disclosure.

FIG. 8 is a block diagram of an exemplary computer system for implementing embodiments consistent with the present disclosure. Variations of computer system 801 may be used for implementing the devices and systems disclosed herein. Computer system 801 may comprise a central processing unit ("CPU" or "processor") 802. Processor 802 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 802 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 802 may be disposed in communication with one or more input/output (I/O) devices via I/O interface 803. The I/O interface 803 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 803, the computer system 801 may communicate with one or more I/O devices. For example, the input device 804 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 805 may be a printer, fax machine, video display (e.g., cathode ray tube (CRT), liquid crystal display (LCD), light-emitting diode (LED), plasma, or the like), audio speaker, etc. In some embodiments, a transceiver 806 may be disposed in connection with the processor 802. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 802 may be disposed in communication with a communication network 808 via a network interface 807. The network interface 807 may communicate with the communication network 808. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 808 may include, without limitation, a direct interconnection, local area network (LAN), wide area network (WAN), wireless network (e.g., using Wireless Application Protocol), the Internet, etc. Using the network interface 807 and the communication network 808, the computer system 801 may communicate with devices 810, 811, and 812. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 801 may itself embody one or more of these devices.

In some embodiments, the processor 802 may be disposed in communication with one or more memory devices (e.g., RAM 813, ROM 814, etc.) via a storage interface 812. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, the databases disclosed herein.

The memory devices may store a collection of program or database components, including, without limitation, an operating system 816, user interface application 817, web browser 818, mail server 819, mail client 820, user/application data 821 (e.g., any data variables or data records discussed in this disclosure), etc. The operating system 816 may facilitate resource management and operation of the computer system 801. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 817 may facilitate display, execution, interaction, manipulation, or operation of program components through textual or graphical facilities. For example, user interfaces may provide computer interaction interface elements on a display system operatively connected to the computer system 801, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 801 may implement a web browser 818 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 801 may implement a mail server 819 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 801 may implement a mail client 820 stored program component. The mail client may be a mail viewing application, such as Apple Mail, Microsoft Entourage, Microsoft Outlook, Mozilla Thunderbird, etc.

In some embodiments, computer system 801 may store user/application data 821, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The specification has described methods and systems for improving fault tolerance in virtual storage area network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A virtual storage area network fault tolerance apparatus, comprising:
   one or more hardware processors; and
   one or more memory units storing instructions which when executed cause the one or more hardware processors to perform acts comprising:
   identifying a fault associated with a hard drive included in a first disk array that includes one or more parity drives;
   determining availability of a parity drive from the one or more parity drives included in the first disk array;
   transferring data associated with the hard drive to the parity drive in the first disk array if the parity drive in the first disk array is available;
   receiving an indication that one or more parity drives included in a second disk array are available for providing fault tolerance for the first disk array if the parity drive in the first disk array is unavailable; and
   transferring data associated with the hard drive included in the first disk array for storage in the one or more parity drives included in the second disk array.

2. The virtual storage area network fault tolerance apparatus of claim 1, wherein the fault identified is that the hard drive included in the first disk array is going to fail.

3. The virtual storage area network fault tolerance apparatus of claim 1, wherein the hard drive included in the first disk array is a solid state drive.

4. The virtual storage area network fault tolerance apparatus of claim 1, wherein the one or more memory units further storing instructions which when executed cause the one or more hardware processors to perform acts comprising:
   determining that all of the one or more parity drives included in the first disk array are in use.

5. The virtual storage area network fault tolerance apparatus of claim 1, wherein at least one of the one or more parity drives included in the second disk array are already in use for providing fault tolerance for the second disk array before the step of receiving the indication that the one or more parity drives included in the second disk array are available for providing fault tolerance for the first disk array.

6. The virtual storage area network fault tolerance apparatus of claim 1, wherein the one or more memory units further storing instructions which when executed cause the one or more hardware processors to perform acts comprising:
   identifying an array controller associated with the one or more parity drives included in the second disk array to process the transferring of the data associated with the hard drive included in the first disk array for storage in the one or more parity drives included in the second disk array.

7. The virtual storage area network fault tolerance apparatus of claim 6, wherein the apparatus is a Driver/Module included in a Management server configured to execute fault tolerance tasks for the first disk array and the second disk array.

8. A method of fault tolerance in virtual storage area network, the method comprising:
   identifying a fault associated with a hard drive included in a first disk array that includes one or more parity drives;
   determining availability of a parity drive from the one or more parity drives included in the first disk array are already in use;
   transferring data associated with the hard drive to the parity drive in the first disk array if the parity drive in the first disk array is available;
   receiving an indication that one or more parity drives included in a second disk array are available for providing fault tolerance for the first disk array if the parity drive in the first disk array is unavailable; and
   transferring data associated with the hard drive included in the first disk array for storage in the one or more parity drives included in the second disk array.

9. The method of claim 8, wherein the fault identified is that the hard drive included in the first disk array is going to fail.

10. The method of claim 8, wherein the hard drive included in the first disk array is a solid state drive.

11. The method of claim 8, further comprising:
    determining that all of the one or more parity drives included in the first disk array are in use.

12. The method of claim 8, wherein at least one of the one or more parity drives included in the second disk array are already in use for providing fault tolerance for the second disk array before the step of receiving the indication that the one or more parity drives included in the second disk array are available for providing fault tolerance for the first disk array.

13. The method of claim 8, further comprising:
    identifying an array controller associated with the one or more parity drives included in the second disk array to process the transferring of the data associated with the hard drive included in the first disk array for storage in the one or more parity drives included in the second disk array.

14. The method of claim 13, wherein the method is performed by a Driver/Module in a Management server configured to execute fault tolerance tasks for the first disk array and the second disk array.

15. A non-transitory computer readable storage medium storing a program that, when executed by a computer, cause the computer to perform a method of fault tolerance in virtual storage area network, the method comprising:
    identifying a fault associated with a hard drive included in a first disk array that includes one or more parity drives;
    determining availability of a parity drive from the one or more parity drives included in the first disk array;
    transferring data associated with the hard drive to the parity drive in the first disk array if the parity drive in the first disk array is available;
    receiving an indication that one or more parity drives included in a second disk array are available for providing fault tolerance for the first disk array if the parity drive in the first disk array is unavailable; and
    transferring data associated with the hard drive included in the first disk array for storage in the one or more parity drives included in the second disk array.

16. The medium of claim 15, wherein the fault identified is that the hard drive included in the first disk array is going to fail.

17. The medium of claim 15, the method further comprising:
    determining that all of the one or more parity drives included in the first disk array are in use.

18. The medium of claim 15, wherein at least one of the one or more parity drives included in the second disk array are already in use for providing fault tolerance for the second disk array before the step of receiving the indication that the one or more parity drives included in the second disk array are available for providing fault tolerance for the first disk array.

19. The medium of claim 15, the method further comprising:
   identifying an array controller associated with the one or more parity drives included in the second disk array to process the transferring of the data associated with the hard drive included in the first disk array for storage in the one or more parity drives included in the second disk array.

20. The medium of claim 19, wherein the method is performed by a Driver/Module in a Management server configured to execute fault tolerance tasks for the first disk array and the second disk array.

* * * * *